US012118920B2

(12) United States Patent
Li

(10) Patent No.: US 12,118,920 B2
(45) Date of Patent: Oct. 15, 2024

(54) DISPLAY PANEL AND DRIVING METHOD THEREOF

(71) Applicant: TCL China Star Optoelectronics Technology Co., Ltd., Guangdong (CN)

(72) Inventor: Wenfang Li, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/295,149

(22) PCT Filed: Apr. 30, 2021

(86) PCT No.: PCT/CN2021/091569
§ 371 (c)(1),
(2) Date: May 19, 2021

(87) PCT Pub. No.: WO2022/217668
PCT Pub. Date: Oct. 20, 2022

(65) Prior Publication Data

US 2024/0127736 A1 Apr. 18, 2024

(30) Foreign Application Priority Data

Apr. 16, 2021 (CN) ......................... 202110409329.3

(51) Int. Cl.
*G09G 3/32* (2016.01)

(52) U.S. Cl.
CPC ....... *G09G 3/32* (2013.01); *G09G 2300/0842* (2013.01); *G09G 2320/029* (2013.01); *G09G 2320/041* (2013.01); *G09G 2330/021* (2013.01)

(58) Field of Classification Search
CPC ..... G09G 3/32–3291; G09G 2320/029; G09G 2320/0295; G09G 2320/041
See application file for complete search history.

(56) References Cited

U.S. PATENT DOCUMENTS 9,318,046 B2 * 4/2016 Xie ...................... G09G 3/3225
9,653,024 B1 * 5/2017 Kuo ...................... G09G 3/3258
10,672,336 B2 * 6/2020 Lee ...................... G09G 3/3233
10,977,996 B2 * 4/2021 Lee ...................... G09G 3/3233
11,632,046 B2 * 4/2023 Kim ...................... H02M 3/156 323/282
11,735,100 B2 * 8/2023 Li ...................... G09G 3/2007 345/76

(Continued)

FOREIGN PATENT DOCUMENTS

CN 101764516 6/2010
CN 103606354 2/2014

(Continued)

*Primary Examiner* — Patrick F Marinelli

(57) ABSTRACT

A display panel and a driving method thereof are provided. The display panel includes a power supply module, a driving module, a current detection module, and a control module. The current detection module detects a driving current of the driving module and outputs a first detection signal when a driving current is greater than a threshold current. The control module receives the first detection signal, regulates and outputs a first data voltage equal to a driving voltage according to the first detection signal, and transmits the first data voltage into the driving module.

16 Claims, 3 Drawing Sheets

(56) References Cited

U.S. PATENT DOCUMENTS

| | | | | |
|---|---|---|---|---|
| 2009/0115795 | A1* | 5/2009 | Pae | G09G 3/3283 345/589 |
| 2011/0050669 | A1* | 3/2011 | Ahn | G09G 3/3258 345/211 |
| 2016/0171929 | A1* | 6/2016 | Lee | G09G 3/3233 345/77 |
| 2020/0243010 | A1* | 7/2020 | Lee | G09G 3/3233 |
| 2021/0118398 | A1* | 4/2021 | Shimizu | G09G 3/3696 |
| 2022/0284853 | A1* | 9/2022 | Bao | G09G 3/006 |
| 2022/0294342 | A1* | 9/2022 | Kim | G09G 3/20 |
| 2022/0406242 | A1* | 12/2022 | Li | G09G 3/2007 |

FOREIGN PATENT DOCUMENTS

| | | |
|---|---|---|
| CN | 105405425 | 3/2016 |
| CN | 108877673 | 11/2018 |
| CN | 109410883 | 3/2019 |
| CN | 109712566 | 5/2019 |
| CN | 112530363 | 3/2021 |
| CN | 112542141 | 3/2021 |

* cited by examiner

DISPLAY PANEL AND DRIVING METHOD THEREOF

RELATED APPLICATIONS

This application is a National Phase of PCT Patent Application No. PCT/CN2021/091569 having International filing date of Apr. 30, 2021, which claims the benefit of priority of Chinese Patent Application No. 202110409329.3 filed on Apr. 16, 2021. The contents of the above applications are all incorporated by reference as if fully set forth herein in their entirety.

FIELD AND BACKGROUND OF THE INVENTION

The present disclosure relates to the field of display technology and particularly to a display panel and a driving method of the display panel.

Because people's requirements for display effect of display panels such as televisions, etc. are increasingly higher, organic light emitting diode (OLED) panels and mini-light emitting diode (mini-LED) panels have become a development trend of the industry. Mini-LED display technology makes use of a plurality of small-sized LED lights to act as light sources of display panels, so that partition control can be realized to improve contrast and saturation of displayed images. In mini-LED panels, a driving method of the LED lights is driving by a constant voltage, and in order to satisfy requirements for brightness and power under normal temperatures, a driving voltage of the LED lights is configured in advance.

However, due to characteristics of the LED lights, a driving current of the LED lights is increased under a high temperature, thereby causing an overall power of the display panels to exceed standards. Therefore, reliability and service life of the display panels are affected.

SUMMARY OF THE INVENTION

The display panel and the driving method thereof provided by the present disclosure can ensure the overall power of the display panels to not exceed the standards.

In order to solve the aforesaid problems, the present disclosure provides technical solutions as follows:

The present disclosure provides a display panel. The display panel includes:

- a power supply module;
- a driving module electrically connected to the power supply module, wherein the power supply module provides a driving voltage to the driving module;
- a current detection module electrically connected to the driving module, wherein the current detection module is configured to detect a driving current of the driving module and to output a first detection signal when the driving current is greater than a threshold current; and
- a control module electrically connected to the current detection module and the driving module, wherein the control module is configured to receive the first detection signal and to regulate and output a first data voltage equal to the driving voltage according to the first detection signal.

In one optional embodiment of the present disclosure, when the driving current is less than or equal to the threshold current, the current detection module outputs a second detection signal. The control module is further configured to receive the second detection signal and to regulate and to output a second data voltage equal to the driving voltage according to the second detection signal.

In one optional embodiment of the present disclosure, the second detection signal is high electric level, and the first detection signal is low electric level.

In one optional embodiment of the present disclosure, the current detection module includes:

- a detection resistor electrically connected to the driving module; and
- a current detection integrated circuit electrically connected to the detection resistor,
- wherein the current detection integrated circuit is configured to calculate a detection current according to a detection voltage between two sides of the detection resistor, to compare the detection current to the threshold current, to output the first detection signal when the detection current is greater than the threshold current, and to output the second detection signal when the detection current is less than or equal to the threshold current.

In one optional embodiment of the present disclosure, the control module includes:

- a field programmable gate array (FPGA) control circuit electrically connected to the current detection integrated circuit;
- a voltage raising circuit electrically connected to the FPGA control circuit; and
- an electric level conversion integrated circuit electrically connected to the voltage raising circuit,
- wherein the FPGA control circuit is configured to receive the first detection signal or the second detection signal and to control the voltage raising circuit to output a first voltage or a second voltage, the electric level conversion integrated circuit correspondingly converts the first voltage or the second voltage into the first data voltage or the second data voltage and transmits the first data voltage or the second data voltage into the driving module.

In one optional embodiment of the present disclosure, the first voltage is less than the second voltage.

In one optional embodiment of the present disclosure, the FPGA control circuit regulates the voltage raising circuit and makes the voltage raising circuit output the first voltage or the second voltage by serial data lines and serial clock lines.

In one optional embodiment of the present disclosure, the display panel further includes:

- a light emitting module electrically connected to the driving module and emitting light under drive of the driving module.

A second aspect of the present disclosure provides a driving module of the display panel. The display panel includes a power supply module, a driving module, a light emitting module, a current detection module, and a control module. The driving method of the display panel includes:

- step S1: providing a driving voltage to the driving module by the power supply module;
- step S2: driving the light emitting module to emit light by the driving module;
- step S3: detecting a driving current of the driving module and outputting a first detection signal by the current detection module when the driving current is greater than a threshold current; and
- step S4: receiving the first detection signal, regulating and outputting a first data voltage equal to the driving voltage according to the first detection signal, and inputting the first data voltage into the driving module by the control module.

In one optional embodiment of the present disclosure, in the step S3, when the driving current is less than or equal to the threshold current, the current detection module outputs a second detection signal, the second detection signal is high electric level, and the first detection signal is low electric level; and in the step S4, the control module further receives the second detection signal, regulates and outputs a second data voltage equal to the driving voltage according to the second detection signal, and inputs the second data voltage into the driving module.

In one optional embodiment of the present disclosure, the control module includes a field programmable gate array (FPGA) control circuit, a voltage raising circuit, and an electric level conversion integrated circuit, and the step S4 includes:

the FPGA control circuit receives the first detection signal or the second detection signal and controls the voltage raising circuit to output the first voltage or the second voltage;

the voltage raising circuit outputs the first voltage or the second voltage; and the electric level conversion integrated circuit correspondingly converts the first voltage or the second voltage into the first data voltage or the second data voltage.

The beneficial effects of the present disclosure are that in the display panel and the driving method thereof provided by the present disclosure, by using the current detection module to detect the driving current of the driving module and outputting the first detection signal when the driving current is greater than the threshold current, and by using the control module to receive the first detection signal and to regulate and to output the first data voltage equal to the driving voltage according to the first detection signal, the driving current of the LED lights under a high temperature can be reduced. Therefore, an overall power of the display panel does not exceed standards, thereby improving reliability and service life of the display panel.

BRIEF DESCRIPTION OF THE SEVERAL VIEWS OF THE DRAWINGS

To more clearly illustrate the technical solutions of the embodiments of the present disclosure, the accompanying figures of the present disclosure will be described in brief. Obviously, the accompanying figures described below are only part of the embodiments of the present disclosure, from which figures those skilled in the art can derive further figures without making any inventive efforts.

DESCRIPTION OF SPECIFIC EMBODIMENTS OF THE INVENTION

Figure 1:
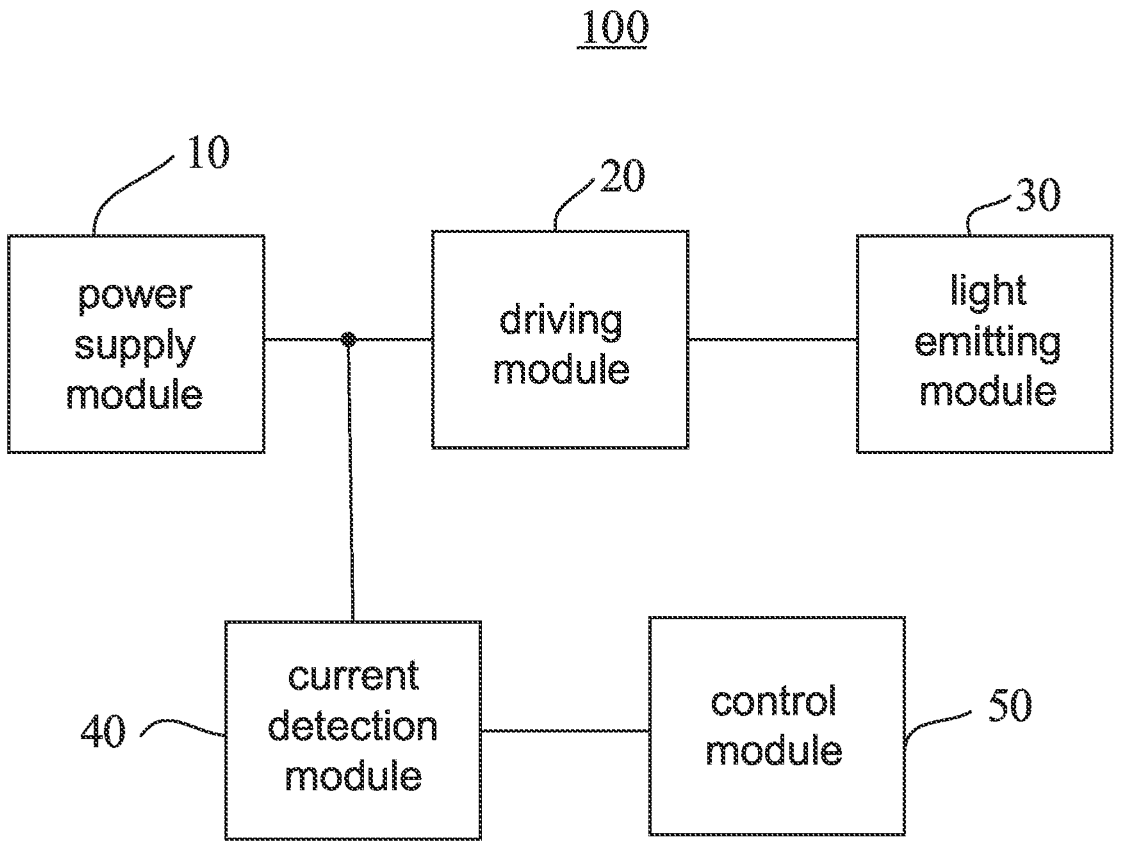
FIG. 1 is a schematic diagram of modules of a display panel provided by the present disclosure.

The technical solutions in the embodiments of the present disclosure are clearly and completely described in the following with reference to the accompanying drawings in the embodiments of the present disclosure. Obviously, the described embodiments are only part of the embodiments of the present disclosure, but are not all embodiments of the present disclosure. All other embodiments obtained by those skilled in the art based on the embodiments of the present disclosure without creative efforts are within the scope of the present disclosure.

In the description of the present disclosure, it is to be understood that the orientation or positional relationship indicated by the terms "upper", "lower", etc. is based on the orientation or positional relationship shown in the accompanying figures, which is merely for the convenience for describing of the present disclosure and for the simplification of the description, and is not intended to indicate or imply that the indicated devices or elements have a specific orientation or is constructed and operated in a specific orientation. Therefore, it should not be understood as a limitation on the present disclosure. Moreover, the terms "first" and "second" are used for descriptive purposes only and are not to be understood as indicating or implying relative importance or implicitly indicating the number of the indicated technical characteristics. Therefore, the characteristics defined by "first" or "second" may include one or more of the described characteristics either explicitly or implicitly. In the description of the present disclosure, the meaning of "a plurality" is two or more unless clearly and specifically defined otherwise.

In addition, the present disclosure may repeat reference numerals and/or reference numerals in different examples, which are for the purpose of simplicity and clarity, and do not indicate the relationship between the various embodiments and/or arrangements discussed.

The present disclosure aims at a technical problem that a driving current of current LED lights is increased under a high temperature, resulting in an overall power of display panels exceeding standards, thereby affecting reliability and service life of the display panels. By using a current detection module to detect a driving current of a driving module and to output a first detection signal when a driving current is greater than a threshold current, and by using a control module to receive the first detection signal and to regulate and to output a first data voltage equal to the driving voltage according to the first detection signal, the driving current of the LED lights under a high temperature can be reduced. Therefore, an overall power of display panels does not exceed standards, thereby improving reliability and service life of the display panels.

The display panel and the driving method thereof of the present disclosure will be further described in detail as follow with reference to specific embodiments.

Figure 2:
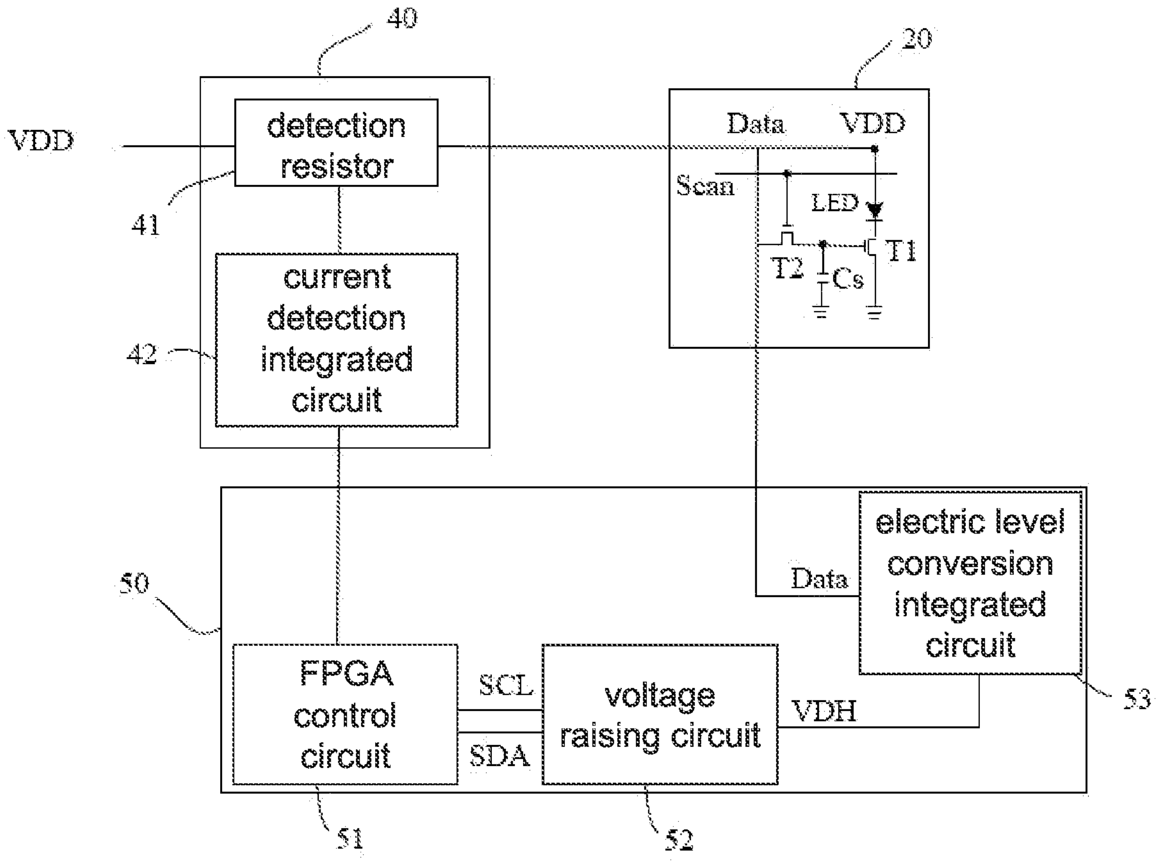
FIG. 2 is a schematic diagram of connective relationships between a driving module, a current detection module, and a control module of the display panel illustrated in FIG. 1.

Please refer to FIGS. 1-2, a preferred embodiment of the present disclosure provides a display panel 100. The display panel 100 includes a power supply module 10, a driving module 20, a light emitting module 30, a current detection module 40, and a control module 50. The driving module 20 is electrically connected to the power supply module 10. The light emitting module 30 is electrically connected to the driving module 20. The current detection module 40 is respectively electrically connected to the power supply module 10 and the driving module 20. The control module 50 is electrically connected to the current detection module 40.

Wherein, the power supply module 10 is configured to provide a driving voltage to the driving module 20.

Wherein, the driving module 20 is configured to provide a driving current to the light emitting module 30 to make the light emitting module 30 emit light.

Wherein, the light emitting module 30 is configured to emit light. Wherein, the light emitting module 30 can include a plurality of light emitting diode (LED) lights distributed in arrays.

Specifically, please refer to FIG. 2, in one optional embodiment of the present disclosure, the driving module 20 includes a driving circuit. The driving circuit includes at least one scanning line Scan, at least one data line Data, a plurality of LED lights, a first transistor T1, a second transistor T2, and a storage capacitor Cs. Wherein, an end of the first transistor T1 is grounded, another end of the first transistor T1 is electrically connected to an end of the LED lights, and another end of the LED lights is connected to the power supply module 10; a gate electrode of the second transistor T2 is electrically connected to the scanning line Scan, a source electrode of the second transistor T2 is electrically connected to the data line Data, a drain electrode of the second transistor T2 is electrically connected to a gate electrode of the first transistor T1; and an end of the storage capacitor Cs is grounded, and another end of the storage capacitor Cs is respectively electrically connected to the gate electrode of the first transistor T1 and the drain electrode of the second transistor T2.

Of course, in other embodiments, specific components and connective relationships of the driving circuit can be configured according to specific situations, and they are not limited to the components and the connective relationships of the driving circuit described in the aforesaid embodiments.

Wherein, the current detection module 40 is configured to detect a driving current of the driving module and to output a first detection signal when the driving current is greater than a threshold current, and when the driving current is less than or equal to the driving current, the current detection module 40 outputs a second detection signal. The second detection signal is high electric level, and the first detection signal is low electric level.

Specifically, please refer to FIG. 2 again. The current detection module 40 includes a detection resistor 41, a current detection integrated circuit 42, and a storage unit (not shown in the figure). The detection resistor 41 is electrically connected to the driving module 20. A voltage between two sides of the detection resistor 41 is equal to a voltage passing through the light emitting module 30. The storage unit stores a threshold current. The current detection integrated circuit 42 is electrically connected to the detection resistor 41. The current detection integrated circuit 42 is configured to calculate a detection current according to a detection voltage between two sides of the detection resistor, to compare the detection current to the threshold current, to output the first detection signal when the detection current is greater than the threshold current, and to output the second detection signal when the detection current is less than or equal to the threshold current.

Wherein, the control module 50 is configured to receive the first detection signal and the second detection signal, to regulate and to output a first data voltage equal to the driving voltage according to the first detection signal, and to output a second data voltage equal to the driving voltage according to the second detection signal.

Specifically, the control module 50 includes a field programmable gate array (FPGA) control circuit 51, a voltage raising circuit 52, and an electric level conversion integrated circuit 53. Wherein, the FPGA control circuit 51 is electrically connected to the current detection integrated circuit 42; the voltage raising circuit is electrically connected to the FPGA control circuit; and the electric level conversion integrated circuit 53 is electrically connected to the voltage raising circuit 52 and the data line Data of the driving module 20.

Wherein, the FPGA control circuit 51 is configured to receive the first detection signal or the second detection signal and to control the voltage raising circuit 52 to output a first voltage VDH1 or a second voltage VDH2, the electric level conversion integrated circuit 53 correspondingly converts the first voltage or the second voltage into the first data voltage or the second data voltage and transmits the first data voltage or the second data voltage into the data line Data of the driving module 20.

Wherein, the first voltage VDH1 is less than the second voltage VDH2.

In one optional embodiment of the present disclosure, the FPGA control circuit 51 regulates the voltage raising circuit 52 and makes the voltage raising circuit 52 output the first voltage VDH1 or the second voltage VDH2 by serial data lines SDA and serial clock lines SCL.

Figure 3:
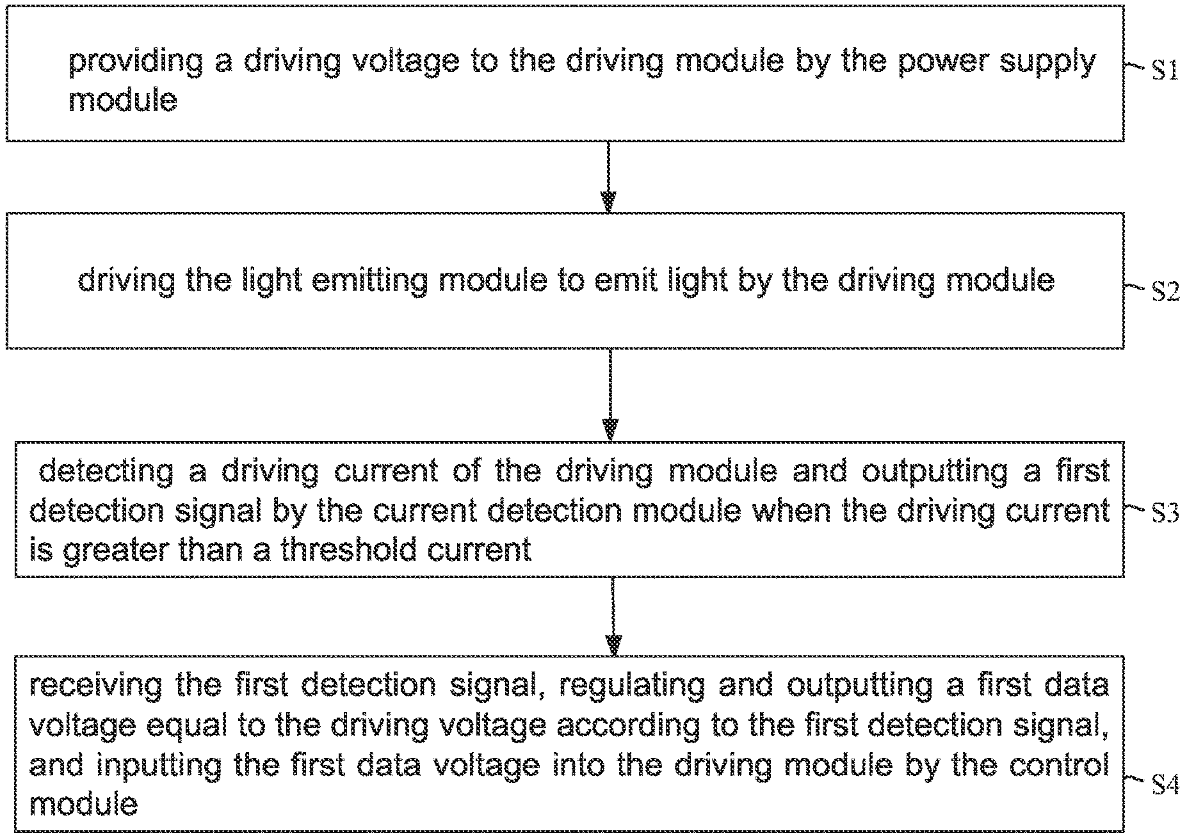
FIG. 3 is a flowchart of a driving method of the display panel illustrated in FIG. 1.

Please refer to FIG. 3, the present disclosure further provides a driving method of the aforesaid display panel 100. The driving method includes:

- step S1: providing a driving voltage to the driving module 20 by the power supply module 10;
- step S2: driving the light emitting module 30 to emit light by the driving module 20;
- step S3: detecting a driving current of the driving module 20 and outputting a first detection signal by the current detection module 40 when the driving current is greater than a threshold current; and
- step S4: receiving the first detection signal, regulating and outputting a first data voltage equal to the driving voltage according to the first detection signal, and inputting the first data voltage into the driving module 20 by the control module 50.

Wherein, in the step S3, when the driving current is less than or equal to the threshold current, the current detection module 40 outputs a second detection signal, the second detection signal is high electric level, and the first detection signal is low electric level.

Wherein, in the step S4, the control module 50 further receives the second detection signal, regulates and outputs a second data voltage equal to the driving voltage according to the second detection signal, and inputs the second data voltage into the driving module 20.

Wherein the step S4 specifically includes following steps:

- step 41: receiving the first detection signal or the second detection signal and controlling the voltage raising circuit 52 to output the first voltage VDH1 or the second voltage VDH2 by the FPGA control circuit 51;
- step S42: outputting the first voltage VDH1 or the second voltage VDH2 by the voltage raising circuit 52; and
- step S43: correspondingly converting the first voltage VDH1 or the second voltage VDH2 into the first data voltage or the second data voltage by the electric level conversion integrated circuit; and
- step S44: transmitting the first data voltage or the second data voltage into the driving module 20 through the data line Data of the driving module 20 by the electric level conversion integrated circuit 53.

The beneficial effects of the present disclosure are that in the display panel and the driving method thereof provided by the present disclosure, by using a current detection module to detect a driving current of a driving module and outputting a first detection signal when a driving current is greater than a threshold current, and by using a control module to receive the first detection signal and to regulate and to outputting a first data voltage equal to the driving voltage according to the first detection signal, the driving current of the LED lights under a high temperature can be reduced. Therefore, an overall power of the display panel does not exceed standards, thereby improving reliability and service life of the display panel.

In addition, whether the driving current exceeds the threshold current can be clearly detected by the current detection module, i.e., whether the LED lights are in a high-temperature environment can be detected clearly.

Furthermore, by using the FPGA control circuit, the voltage raising circuit, and the electric level conversion integrated circuit to compose the control module, the first data voltage equal to the driving voltage can be better regulated and outputted.

In summary, although the present disclosure has disclosed the preferred embodiments as above, however the above-mentioned preferred embodiments are not to limit to the present disclosure. A person skilled in the art can make any change and modification, therefore the scope of protection of the present disclosure is subject to the scope defined by the claims.

What is claimed is:

1. A display panel, comprising:
- a power supply module;
- a driving module electrically connected to the power supply module, wherein the power supply module provides a driving voltage to the driving module;
- a current detection module electrically connected to the driving module, wherein the current detection module is configured to detect a driving current of the driving module and to output a first detection signal when the driving current is greater than a threshold current; and
- a control module electrically connected to the current detection module and the driving module, wherein the control module is configured to receive the first detection signal, to regulate and output a first data voltage equal to the driving voltage according to the first detection signal, and to transmit the first data voltage into the driving module,
- wherein the current detection module comprises:
  - a detection resistor electrically connected to the driving module; and
  - a current detection integrated circuit electrically connected to the detection resistor,
- wherein the current detection integrated circuit is configured to calculate a detection current according to a detection voltage between two sides of the detection resistor, to compare the detection current to the threshold current, to output the first detection signal when the detection current is greater than the threshold current, and to output a second detection signal when the detection current is less than or equal to the threshold current,
- wherein the control module comprises:
  - a field programmable gate array (FPGA) control circuit electrically connected to the current detection integrated circuit;
  - a voltage raising circuit electrically connected to the FPGA control circuit; and
  - an electric level conversion integrated circuit electrically connected to the voltage raising circuit, and
- wherein the FPGA control circuit is configured to receive the first detection signal or the second detection signal and to control the voltage raising circuit to output a first voltage or a second voltage, the electric level conversion integrated circuit correspondingly converts the first voltage or the second voltage into the first data voltage or a second data voltage and transmits the first data voltage or the second data voltage into the driving module.

2. The display panel as claimed in claim 1, wherein when the driving current is less than or equal to the threshold current, the current detection module outputs a second detection signal, and the control module is further configured to receive the second detection signal and to regulate and to output a second data voltage equal to the driving voltage according to the second detection signal.

3. The display panel as claimed in claim 2, wherein the second detection signal is high electric level, and the first detection signal is low electric level.

4. The display panel as claimed in claim 1, wherein the first voltage is less than the second voltage.

5. The display panel as claimed in claim 1, wherein the FPGA control circuit regulates the voltage raising circuit and makes the voltage raising circuit output the first voltage or the second voltage by serial data lines and serial clock lines.

6. The display panel as claimed in claim 2, wherein the current detection module comprises:
- a detection resistor electrically connected to the driving module; and
- a current detection integrated circuit electrically connected to the detection resistor,
- wherein the current detection integrated circuit is configured to calculate a detection current according to a detection voltage between two sides of the detection resistor, to compare the detection current to the threshold voltage, to output the first detection signal when the detection current is greater than the threshold current, and to output the second detection signal when the detection current is less than or equal to the threshold current.

7. The display panel as claimed in claim 3, wherein the current detection module comprises:
- a detection resistor electrically connected to the driving module; and
- a current detection integrated circuit electrically connected to the detection resistor,
- wherein the current detection integrated circuit is configured to calculate a detection current according to a detection voltage between two sides of the detection resistor, to compare the detection current to the threshold current, to output the first detection signal when the detection current is greater than the threshold current, and to output the second detection signal when the detection current is less than or equal to the threshold current.

8. The display panel as claimed in claim 1, wherein the display panel further comprises:
- a light emitting module electrically connected to the driving module and emitting light under drive of the driving module.

9. A driving method of a display panel, wherein the display panel comprises a power supply module, a driving module, a light emitting module, a current detection module, and a control module, and the driving method of the display panel comprises:
- providing a driving voltage to the driving module by the power supply module;
- driving the light emitting module to emit light by the driving module;

detecting a driving current of the driving module and outputting a first detection signal by the current detection module when the driving current is greater than a threshold current; and receiving the first detection signal, regulating and outputting a first data voltage equal to the driving voltage according to the first detection signal, and inputting the first data voltage into the driving module by the control module, wherein in the step of detecting the driving current of the driving module and outputting the first detection signal by the current detection module when the driving current is greater than the threshold current, when the driving current is less than or equal to the threshold current, the current detection module outputs a second detection signal, the second detection signal is high electric level, and the first detection signal is low electric level; and in the step off receiving the first detection signal, regulating and outputting the first data voltage equal to the driving voltage according to the first detection signal, and outputting the first data voltage into the driving module by the control module, the control module further receives the second detection signal, regulates and outputs a second data voltage equal to the driving voltage according to the second detection signal, and inputs the second data voltage into the driving module, wherein the control module comprises a field programmable gate array (FPGA) control circuit, a voltage raising circuit, and an electric level conversion integrated circuit, and the step of receiving the first detection signal, regulating and outputting the first data voltage equal to the driving voltage according to the first detection signal, and outputting the first data voltage into the driving module by the control module comprises:

the FPGA control circuit receives the first detection signal or the second detection signal and controls the voltage raising circuit to output a first voltage or a second voltage;

the voltage raising circuit outputs the first voltage or the second voltage; and the electric level conversion integrated circuit correspondingly converts the first voltage or the second voltage into the first data voltage or the second data voltage.

10. The driving method of the display panel as claimed in claim 9, wherein the first voltage is less than the second voltage.

11. The driving method of the display panel as claimed in claim 9, wherein the FPGA control circuit regulates the voltage raising circuit and makes the voltage raising circuit output the first voltage or the second voltage by serial data lines and serial clock lines.

12. The driving method of the display panel as claimed in claim 9, wherein the display panel further comprises:

a light emitting module electrically connected to the driving module and emits light under drive of the driving module.

13. The driving method of the display panel as claimed in claim 9, wherein the current detection module comprises:

a detection resistor electrically connected to the driving module; and a current detection integrated circuit electrically connected to the detection resistor, wherein the current detection integrated circuit is configured to calculate a detection current according to a detection voltage between two sides of the detection resistor, to compare the detection current to the threshold current, to output the first detection signal when the detection current is greater than the threshold current, and to output a second detection signal when the detection current is less than or equal to the threshold current.

14. The driving method of the display panel as claimed in claim 13, wherein the current detection module further comprises a storage unit, and the storage unit stores the threshold current in advance.

15. The driving method of the display panel as claimed in claim 9, wherein the driving module comprises a driving circuit.

16. The driving method of the display panel as claimed in claim 15, wherein the driving circuit comprises at least one scanning line, at least one data line, a plurality of light emitting diode (LED) lights, a first transistor, a second transistor, and a storage capacitor; an end of the first transistor is grounded, another end of the first transistor is electrically connected to an end of the LED lights, and another end of the LED lights is connected to the power supply module; a gate electrode of the second transistor is electrically connected to the scanning line, a source electrode of the second transistor is electrically connected to the data line, a drain electrode of the second transistor is electrically connected to a gate electrode of the first transistor; an end of the storage capacitor is grounded, and another end of the storage capacitor is respectively electrically connected to the gate electrode of the first transistor and the drain electrode of the second transistor.

* * * * *